United States Patent [19]
Norman

[11] 3,716,319
[45] Feb. 13, 1973

[54] APPARATUS FOR FORMING THE CRUST OF A PIE

[76] Inventor: Harold E. Norman, Ponca City, Okla.

[22] Filed: April 20, 1970

[21] Appl. No.: 30,065

[52] U.S. Cl. ............. 425/293, 425/317, 425/394, 99/92, 99/349, 99/430
[51] Int. Cl. ............................................. A21c 11/10
[58] Field of Search ..... 107/1 E, 4 C, 49, 15 R, 15 A, 107/50, 54 R, 54 D, 68; 99/349, 92, 430; 112/124; 12/88; 30/292, 319, 286; 425/317, 394

[56] References Cited

UNITED STATES PATENTS

| | | | |
|---|---|---|---|
| 1,964,699 | 6/1934 | Wikstrom | 107/49 |
| 128,021 | 6/1872 | Cook | 30/292 |
| 860,641 | 7/1907 | Croxford | 107/49 |
| 2,774,316 | 12/1956 | Daino | 107/54 R |
| 3,461,821 | 8/1969 | Gallus | 107/15 R |
| 2,896,555 | 7/1959 | Marcus et al. | 107/1 E |
| 3,202,114 | 8/1965 | Cameron et al. | 107/1 E |
| 2,734,464 | 2/1956 | Hallock et al. | 107/54 D |
| 3,157,135 | 11/1964 | Fetrow et al. | 107/50 |
| 3,217,666 | 11/1965 | Thode | 107/50 |

FOREIGN PATENTS OR APPLICATIONS

| | | | |
|---|---|---|---|
| 511,648 | 8/1939 | Great Britain | 30/319 |
| 1,055,780 | 4/1959 | Germany | 99/349 |
| 323,924 | 1/1930 | Great Britain | 107/1 E |

*Primary Examiner*—Jordan Franklin
*Assistant Examiner*—George H. Krizmanich
*Attorney*—William J. Miller and Dunlap & Laney

[57] ABSTRACT

A method for forming the crust of a pie, particularly a pizza pie, by rolling the crust to a predetermined thickness, placing the rolled crust over a pie pan, pressing the crust to the bottom of the pie pan by a disc-shaped platen, forming the sides of the pie by placing a contoured forming tool against the top of the disc-shaped platen and rolling the preformed roller around the edge of the pie forcing the edge of the pie against the side of the pie pan. The pie is trimmed by having a second roller which contains a circular or disc knife. Thus the axis of the disc knife is parallel to the bottom of the pie pan and spaced a predetermined distance above the disc-shaped platen. The disc cutter is placed against the top of the platen in the same manner as the knife forming roller and rotated around the edge of the pie pan in a manner to trim the excess dough from the pie. The cut is made slightly below the top surface of the pan.

4 Claims, 6 Drawing Figures

PATENTED FEB 13 1973 3,716,319

INVENTOR.
HAROLD E. NORMAN
BY
ATTORNEY

APPARATUS FORMING THE CRUST OF A PIE

BRIEF DESCRIPTION OF PRIOR ART

Background of the Invention

Prior to the method described herein, a pizza pie, for example, was formed by rolling dough to a prescribed thickness, placing the dough over the pie pan and pressing the dough into the pie pan by the use of hands. When the dough was formed to the bottom and sides of the pan, either a knife or a roller was used to cut the excess dough from around the pie pan. Since the top edge of the dough will burn if it is not pressed slightly below the top edge of the pie pan, usually the dough was pushed down slightly. All of the hand manipulation of the dough took an excessive amount of time to prepare a pizza pie crust; therefore, it is the object of this invention to describe a method and apparatus for forming the crust of a pizza pie that can be done uniformly and rapidly. It is the further object of this invention to describe an apparatus that can form the bottom of a pie crust, in many cases without requiring additional forming of the sides. It is a still further object of this invention to provide a method for trimming a pizza pie slightly below the top edge of the pie pan so that the crust will not be submitted to excessive heat resulting in the crust being burnt. It is a still further object of this invention to describe a combination tool that will form the crust to the side of the pie pan and trim the crust slightly below the top edge of the pie pan in a single operation.

This and other objects will be evident when reference is made to the specification in drawings.

BRIEF DESCRIPTION OF THE FIGURES

FIG. 3 shows a side view of the cutting tool, while

DETAILED DESCRIPTION OF THE METHOD AND APPARATUS

Figure 1:
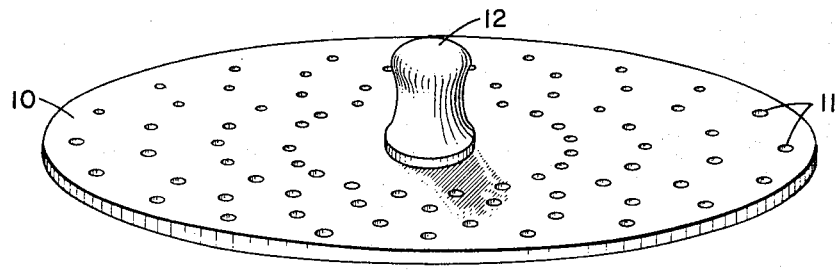
FIG. 1 shows a perspective view of the disc-shaped platen used to form the bottom of the crust.

Referring to FIG. 1, the bottom-forming platen is shown comprising a disc 10 having a plurality of holes 11 formed therethrough. A handle 12 is attached centrally to the disc to form a means for pushing the dough to the bottom of a pan and for removing the disc once the dough has been formed.

Figure 2:
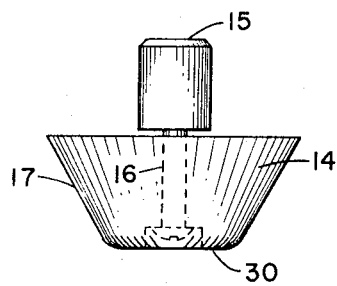
FIG. 2 shows a side view of the rotatable side-forming tool.

FIG. 2 shows a side-forming tool and essentially comprises a contoured partial cone frustum 14 having a handle 15 rotatably attached to the cone portion 14 by means of a screw 16 shown in dotted lines. The side wall 17 of cone 16 is tapered to conform to the taper of the pan where the dough is placed.

Figure 3:
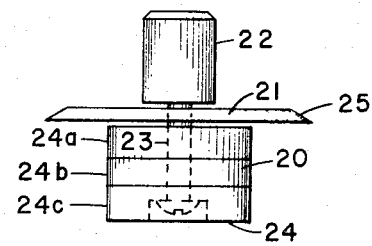

FIG. 3 discloses a cutting tool comprising a spacer 20, a cutting edge 21 rotatibly attached to spacer 20 and the handle 22. Spacer 20, cutter 21, and handle 22 are axially secured by a screw 23 shown in dotted lines. Rotating cutter 21 is disc in shape and sharpened at its outer edge 25.

Figure 4:
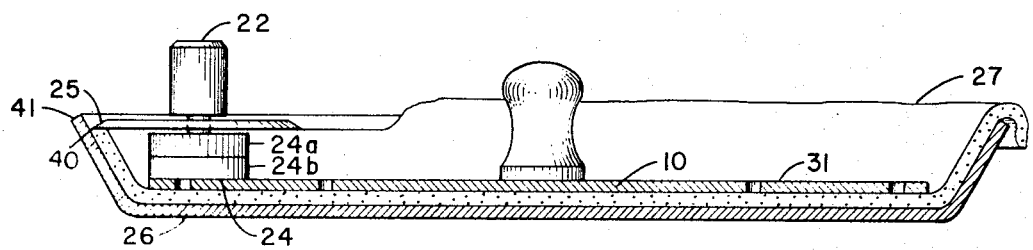
FIG. 4 is a cross-sectional view of the platen shown in FIG. 1 and the tool in FIG. 3 in actual operation and FIG. 5 shows a combination forming tool and cutting tool in use.
Figure 5:
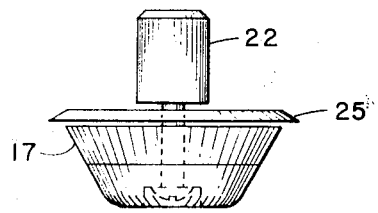

The method of forming the pizza crust is described with reference to FIGS. 4 and 5. Referring in particular to FIG. 4, a pie pan 26 has placed over it a quantity of pre-rolled dough 27. The dough should have sufficient size to completely cover the pan and generally is rolled to a predetermined thickness. Once the dough is placed over the pan, the platen 10 is placed centrally over the dough and pressed rapidly downward. The proper platen has previously been selected and should be of a diameter approximately the size of the bottom of the pie pan. The total diameter should be less than the diameter of the pie pan by twice the thickness of the crust. When the platen is placed over the crust and forced downward, the crust will be firmly pressed against the bottom of the pan and, since the platen is approximately the size of the interior of the pizza pie, the bottom will be completely formed and flat. On many occassions in small pizza pies, the sides will automatically form or can be formed by a quick motion of the fingers without additional forming with rollers such as shown in FIG. 2; however, for some crusts and for larger pans, it is preferable to form the side into a smooth, conicle contour by use of the roller shown in FIG. 2.

The roller in FIG. 2 is placed against the platen so that the bottom 30 of roller edge 17 is placed against the top 31 of platen 10. Grasping handle 15, the roller edge 17 is then pushed against the dough and rolled about the pan. This will form a continuous smooth surface on the inner wall of the dough urging it tightly against the inner wall of the pan 26. The third step requires cutting the excess dough from the crust. For this purpose, a cutter such as that shown in FIG. 3 is used. As in the case with the roller shown in FIG. 2, the handle 22 is grasped and the bottom 24 of spacer 20 is placed against the top 31 of platen and cutting edge 25 is then pressed through the dough 27 and against the inner wall of pan 26. The cutter is then rotated about the pan keeping the pressure against the inner wall of pan 26 at all times. The dough will then be cut forming an edge 40 below the upper rim 41 of pan 26. The height of spacer 20, that is the distance between the bottom 24 and cutting edge 25, is adjusted so that the cutting edge 25 will clip the dough just below the top edge 41 of pan 26. This distance between 24 and 25 is determined by the thickness of dough 27, the thickness of platen 10, and the height 41 of pan 26. Various spacers such as 24a, 24b or 24c can be used to adjust the overall height, depending upon the particular pan being cut. These spacers can be added mechanically by snapping them together, or they can be added by simply loosening screw 23, adding a spacer and reinserting the screw into handle 22. Since all of the spacers and blade in handle rotate freely, the spacers need not be physically connected either to each other or to the blade 21. Referring to FIG. 5, a combination, shown in FIGS. 2 and 3, is shown. Instead of a spacer 20, the roller 14 is substituted. Above the roller 14 is cutting disc 21 and handle 22, which is attached in the usual manner by means of a screw not shown.

Figure 6:
FIG. 6 is another form of platen shown in FIG. 1, shown in partial cross section.

Holes 11 through platen 10 provide for escape of the air between the upper surface of the dough and the under surface of platen 10. The holes also provide for a vacuum relief so that when platen 10 is lifted, it will not pull the dough up with the platen because of the vacuum underneath the platen a rough surface 13 on the underneath surface of the platen 10 can be used to prevent the formation of vacuum, instead of using the holes 11, see FIG. 6.

The materials used in the construction of the tools of this invention are not critical. The platen may be constructed of aluminum, plastic or silicone-coated plastic or teflon-coated plastic. The main pre-requisite of the platen is that it have sufficient mechanical strength to force the dough into conformity with the bottom of the pan. If the material is too flexible, it will deform and not cause proper forming of the dough at the bottom. The platen also performs a second useful function, since the upper surface of the platen forms the sliding base for the forming tool and the cut-off tool. Thus, the platen in combination with the cut-off tools, shown in FIGS. 2, 3, or 5, makes a useful means for the formation of a crust for a pizza. The cutting edge 25 is preferably made of a hard substance such as tempered steel; however, plastic of sufficient strength could be used. One advantage to the coating of the materials with teflon, for example the bottom and sides of platen 10, is that the dough will not adhere readily to a material such as teflon.

These and other advantages of this method and apparatus can be appreciated and modifications can be made within the spirited scope of this invention as disclosed and claimed in the appending claims.

What I claim is:

1. An apparatus for forming a pizza pie crust comprising a pan having a bottom and side wall and an upper edge, a platen having a dimension slightly less than the inner dimension of said pan, said platen having a smooth upper surface, said platen further having vacuum relieving means, and means slidably engaging the smooth upper surface of said platen and engaging the side wall below the upper edge for trimming pie crust slightly below the upper edge of said pan.

2. A device as described in claim 1 wherein said means for trimming the upper edge of pie crust slightly below the top edge of said pan comprises a disc slidably engaging the upper surface of said platen, a handle, a circular cutting tool axially attached between said handle and said disc.

3. Apparatus for forming a crust in a pan for a pizza pie, said apparatus comprising in combination a pan having a side wall and a top edge, a platen having a dimension slightly less than the inner dimension of said pan, a handle attached to one side of said platen, and vacuum relieving means in said platen; and a cut-off means comprising a spacer fitting against the handle attaching side of said platen and slidably engaging said handle attaching side of said platen and a cut-off means spaced above said spacer, the thickness of said spacer placing said cut-off means slightly below the said top edge of said pan.

4. A device is described in claim 3 and additionally including in combination a roller means adapted to slide against the handle attaching surface of said platen, the outer edge of said rolling means having a contour substantially identical to that of the inner wall of said pan and a height equal to or greater than the distance from the handle attaching surface of said platen to the top edge of said pan when said platen is in use.

* * * * *